United States Patent
Maier et al.

(10) Patent No.: US 11,487,770 B2
(45) Date of Patent: Nov. 1, 2022

(54) SORTING DATA ELEMENTS OF A GIVEN SET OF DATA ELEMENTS

(71) Applicant: International Business Machines Corporation, Armonk, NY (US)

(72) Inventors: Albert Maier, Tuebingen (DE); Mike W. Grasselt, Leinfelden-Echterdingen (DE); Yannick Saillet, Stuttgart (DE); Lars Bremer, Boeblingen (DE); Michael Baessler, Bempflingen (DE)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 16/876,573

(22) Filed: May 18, 2020

(65) Prior Publication Data

US 2021/0357183 A1    Nov. 18, 2021

(51) Int. Cl.
| | |
|---|---|
| G06F 16/00 | (2019.01) |
| G06F 16/2457 | (2019.01) |
| G06F 16/953 | (2019.01) |
| G06F 7/08 | (2006.01) |
| G06F 8/77 | (2018.01) |
| G06N 20/20 | (2019.01) |
| G06F 21/62 | (2013.01) |

(52) U.S. Cl.
CPC ...... *G06F 16/24578* (2019.01); *G06F 16/953* (2019.01); *G06F 7/08* (2013.01); *G06F 8/77* (2013.01); *G06F 21/6218* (2013.01); *G06N 20/20* (2019.01)

(58) Field of Classification Search
CPC .... G06F 7/08; G06F 16/953; G06F 16/24578; G06F 8/77; G06F 21/6218; G06N 20/20
USPC .................................................. 707/600–899
See application file for complete search history.

(56) References Cited

U.S. PATENT DOCUMENTS

| | | | |
|---|---|---|---|
| 7,991,840 B2 * | 8/2011 | Boyer .................. | G06F 16/958 709/205 |
| 10,248,672 B2 | 4/2019 | Jugulum et al. | |
| 10,303,690 B1 | 5/2019 | Todd et al. | |

(Continued)

FOREIGN PATENT DOCUMENTS

| | | |
|---|---|---|
| CN | 105117398 A | 12/2015 |
| CN | 106095921 A | 11/2016 |

OTHER PUBLICATIONS

International Search Report and Written Opinion, Application No. PCT/IB2021/053163, dated Jul. 1, 2021, 8 pgs.

*Primary Examiner* — Michelle N Owyang
(74) *Attorney, Agent, or Firm* — Kelli D. Morin

(57) ABSTRACT

A computer implemented method is used for sorting data elements of a given set. The method includes performing an evaluation of a first type of usage of each data element. The method includes determining a set of data element candidates dependent on the evaluation of the first type of usage. The method includes performing an evaluation of a second type of usage of each data element of the set of data element candidates. The method includes sorting the data elements of the set of data element candidates dependent on the evaluation of the second type of usage of each data element of the set of data element candidates. The method includes providing the sorted data elements of the set of data element candidates, and in response, receiving a request for a data processing based on the provided sorted data elements of the set of data element candidates.

20 Claims, 4 Drawing Sheets

(56) References Cited

U.S. PATENT DOCUMENTS

| | | | |
|---|---|---|---|
| 10,742,771 B2* | 8/2020 | Mohen | H04L 67/01 |
| 2009/0100043 A1* | 4/2009 | Stefik | G06N 5/022 |
| 2015/0049927 A1 | 2/2015 | Nufer et al. | |
| 2015/0324409 A1* | 11/2015 | Park | G06F 16/24578 |
| | | | 707/723 |
| 2015/0356095 A1* | 12/2015 | Davis Jones | G06F 16/122 |
| | | | 707/694 |
| 2016/0098430 A1 | 4/2016 | Nakagawa | |
| 2017/0097940 A1* | 4/2017 | Panuganty | G06F 16/90324 |
| 2018/0365052 A1 | 12/2018 | Chakra et al. | |
| 2019/0121898 A1 | 4/2019 | Giresi et al. | |

* cited by examiner

SORTING DATA ELEMENTS OF A GIVEN SET OF DATA ELEMENTS

BACKGROUND

The present disclosure relates to the field of digital computer systems, and more specifically, to a method for sorting data elements of a given set of data elements.

In communication systems, especially in those used in large enterprises, a huge amount of data elements is created and processed. A processing of such data elements may be a transfer of the data elements from one component to another component of the communication systems or storing the data elements in a storage device of the communication systems. The processing of the data elements may be performed according to rules. A rule according to which each of the data elements may be processed may differ according to a role, an influence, or an importance of the respective data element in the communication systems. Given the huge amount of data elements in the communication systems, it takes a huge amount of knowledge for humans to assign an appropriate level of influence or importance to each of the data elements.

SUMMARY

Various embodiments provide a computer implemented method for sorting data elements of a given set of data elements, a computer program product and a computer system as described by the subject matter herein. Advantageous embodiments are described in the following disclosure. Embodiments of the present disclosure can be freely combined with each other if they are not mutually exclusive.

In one aspect, the disclosure relates to a computer implemented method for sorting data elements of a given set of data elements. The method comprises:

performing an evaluation of a first type of usage of each data element of the given set of data elements, a result of each evaluation of the first type of usage of the respective data element indicating an influence level of the respective data element with respect to a first type of communication in the communication system;

determining a set of data element candidates for the sorting dependent on the evaluation of the first type of usage of each data element of the given set of data elements, the set of data element candidates being a proper subset of the given set of data elements;

performing an evaluation of a second type of usage of each data element of the set of data element candidates, a result of each evaluation of the second type of usage of the respective data element indicating an influence level of the respective data element with respect to a second type of communication in the communication system;

sorting the data elements of the set of data element candidates dependent on the evaluation of the second type of usage of each data element of the set of data element candidates;

providing the sorted data elements of the set of data element candidates; and in response to the providing of the sorted data elements of the set of data element candidates, receiving a request for a data processing based on the provided sorted data elements of the set of data element candidates.

In another aspect, the disclosure relates to a computer program product comprising a computer-readable storage medium having computer-readable program code embodied therewith. The computer-readable program code is configured to implement the method according to preceding embodiments.

In another aspect, the disclosure relates to a computer system for sorting data elements of a given set of data elements. The computer system is configured to:

perform an evaluation of a first type of usage of each data element of the given set of data elements, a result of each evaluation of the first type of usage of the respective data element indicating an influence level of the respective data element with respect to a first type of communication in the communication system;

determine a set of data element candidates for the sorting dependent on the evaluation of the first type of usage of each data element of the given set of data elements, the set of data element candidates being a proper subset of the given set of data elements;

perform an evaluation of a second type of usage of each data element of the set of data element candidates, a result of each evaluation of the second type of usage of the respective data element indicating an influence level of the respective data element with respect to a second type of communication in the communication system;

sort the data elements of the set of data element candidates dependent on the evaluation of the second type of usage of each data element of the set of data element candidates;

provide the sorted data elements of the set of data element candidates; and in response to the providing of the sorted data elements of the set of data element candidates, receive a request for a data processing based on the provided sorted data elements of the set of data element candidates.

BRIEF DESCRIPTION OF THE DRAWINGS

In the following, embodiments of the disclosure are explained in greater detail, by way of example only. The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
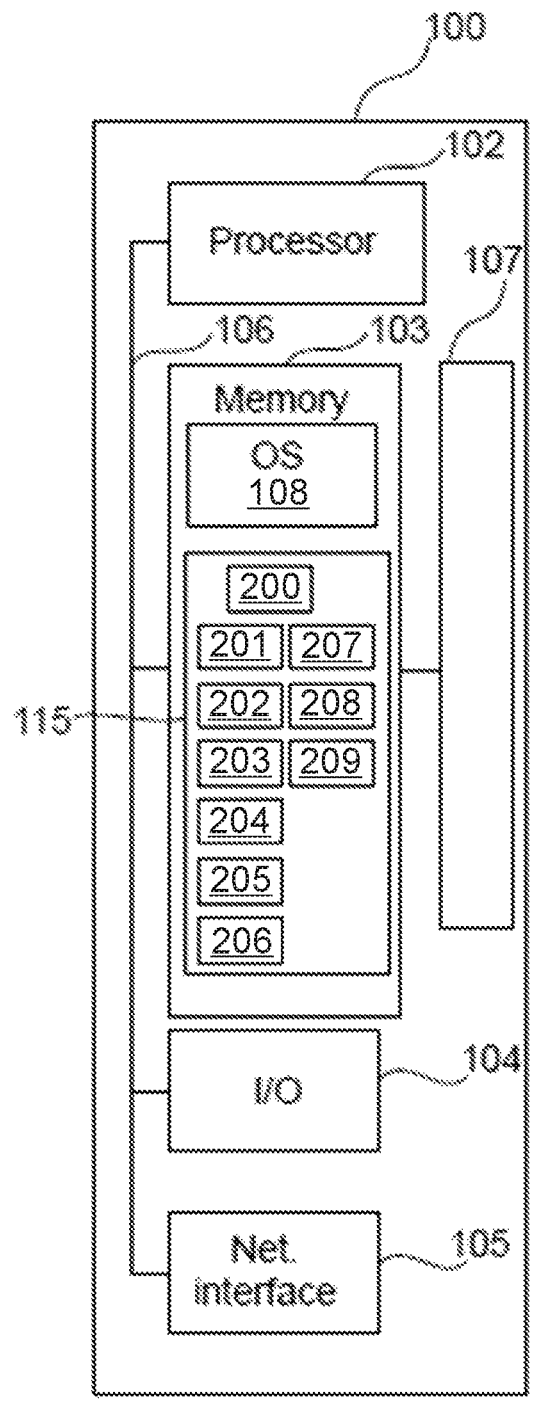
FIG. 1 depicts a first computer system for sorting data elements, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

The present disclosure relates to the field of digital computer systems, and more specifically, to a method for sorting data elements of a given set of data elements. While the present disclosure is not necessarily limited to such applications, various aspects of the disclosure may be appreciated through a discussion of various examples using this context.

The data elements of the given set of data elements may be arranged in the form of a table, a vector, or a matrix. Furthermore, the data elements may be physically stored in a storage device of the communication system. The term "given set of data elements" as used herein refers to a set of data elements that is accessible within the communication system. In order to be accessible, the given set of data elements may be loaded into the storage device.

The data elements of the given set of data elements may also be referred to herein as given data elements. The evaluation of the first type of usage of each given data element may be performed using the same method of evaluation for each given data element. This may alleviate a comparison of the evaluations of the first type of usage of the given data elements.

The data elements of the set of data element candidates are also referred to herein as data element candidates. Preferably, the evaluation of the second type of usage of each data element candidate may be performed using the same method of evaluation for each data element candidate.

The present method may enable an efficient sorting of the given data elements, wherein the first type and the second type of usage are considered. Applying the evaluation of the second type of usage to the data element candidates, instead of applying the evaluation of the second type of usage to the given data elements including the data element candidates, reduces computational resources as the set of data element candidates is a proper subset of the given set of data elements. The set of data element candidates being a proper subset of the given set of data elements implies that a number of the data element candidates is less than a number of the given data elements. Preferably, the number of the given data elements is at least two, but more preferably ten, times higher than the number of the data element candidates.

As the data element candidates are provided in a sorted manner, the data element candidates may be used in a sorted format in response to the request for the data processing. The data processing may be based on the provided sorted data element candidates. For example, a portion of the data element candidates may be chosen for the data processing on the basis of a criteria, according to which the data element candidates may be sorted. The data processing may comprise updating, maintaining, or changing the data element candidates or a chosen portion of the data element candidates. Furthermore, the data processing may comprise using the data element candidates or the chosen portion of the data element candidates to create a database or a component of the communication system, for example an artificial intelligence module. The sorting of the data element candidates may alleviate the data processing. For example, the data processing may be performed in a scheduled manner, wherein a schedule may be created based on a sorted state of the data element candidates. In another example, the data processing may be performed using only the chosen portion of the sorted data element candidates.

Generally, the method enables performance of the data processing using only the data element candidates or only the chosen portion of the data element candidates. Thus, an amount of effort required for the data processing may be less than an amount of effort required to process all the given data elements. The data element candidates, especially the chosen portion of the data element candidates, may be considered as being more important than the rest of the given data elements. In most cases, an importance of each given data element and each data element candidate may correspond to their respective influence level with respect to the first and second type of communication, respectively.

The data element candidates, preferably the chosen portion of the data element candidates, may be considered critical data elements as their influence on the communication system may be higher than that of the rest of the data elements. For example, their higher influence may result in the information of the critical data elements having a stronger impact on a generation of the artificial intelligence module compared to the rest of the data elements. Hence, the critical data elements may comprise valuable information about the communication system and may therefore be protected with a higher effort than the rest of the data elements.

The method further enables generation of a higher usage of the data element candidates or only the chosen portion of the data element candidates within the communication system relative to the rest of the given data elements. Thus, the influence of these data elements to the communication system may be higher than that of the rest of the data elements.

In order to further reduce the computational resources, the computational costs of the evaluation of the first type of usage for a single one of the given data elements may be lower than the computational costs of the evaluation of the second type of usage for a single one of data element candidates. This may apply to all given data elements and all data element candidates.

The term "indicating an influence level" as used herein means that the result of each evaluation of the first or the second type of usage may be used as an indicator to estimate the influence level of the respective data element with respect to the first and the second types of communication, respectively. In a simple embodiment, the result of each evaluation may be in the form of a respective score, wherein a higher value of the respective score indicates a higher influence level of the respective data element compared to a lower value of the respective score.

The first type and the second type of communication may each be defined by a first and a second communication network, respectively, in which the first and second type of communication respectively may be performed. The first and second communication network are a part of the communication system and are different from each other. The first and second communication network may each comprise one or more sending components configured to send the given data elements and the data element candidates, respectively, and one or more receiving components configured to receive the given data elements and the data element candidates, respectively. The sending components of the first communication network may differ from the sending components of the second communication network. The same may apply to the receiving components of the two networks. This kind of definition of the first and second type of communication takes advantage of the fact that the higher the level of importance of one of the given data elements, the higher a number of the sending and/or receiving components processing the respective data element may be.

The first type and the second type of usage may each be defined by a first and second type of data processing of the given data elements and the data element candidates, respectively. The first and second types of data processing are different from each other. Generally, the first and the second types of usage may have different impacts on the communication system. For example, the first type of usage may generate first further data elements and the second type of usage may generate second further data elements, wherein the first further data elements are different from the second further data elements.

Referring to the above described definition of the first and second types of usage, the first and second types of communication may alternatively be defined by a step of a data processing when performing the first and second types of usage respectively. The respective step of data processing may comprise sending the given data elements and the data element candidates, respectively, from a volatile storage device to a further volatile storage device.

The first and second types of communication may be related to the first and second types of usage, respectively. For example, the first and second types of communication may be the above described step of the data processing or may enable the first and second types of usage, respectively, by transferring the given data elements within the first communication network and the data element candidates in the second communication network, respectively.

The evaluation of the first and second types of usage may be performed by examining the first and second types of communication, respectively. This may alleviate the need to judge an importance of the given data elements and the given data element candidates with respect to the first and second types of usage, respectively. An examination of the first and second types of communication may be performed by examining if or how many times each given data element and each data element candidate is used in a single step of the first and second types of communication when performing the first and second types of usage, respectively.

However, the method is not restricted to examining the first and second types of communication. Generally, independently of how the evaluation of the first and second types of usage may be performed, the result of the evaluation of the first and second types of usage of the respective given data element and data element candidate, respectively, may indicate the influence level of the respective given data element and data element candidate, respectively, with respect to the first and second types of communication, respectively. According to some embodiments, the first type of usage may be designed as the first type of communication. In addition, or alternatively, the second type of usage may be designed as the second type of communication.

According to some embodiments, the evaluation of the first type of usage of each data element of the given set of data elements comprises determining a first influence value of the respective data element. The first influence value of the respective data element may indicate the influence level of the respective given data element with respect to the first type of communication in the communication system. The first influence value may allow a simple assessment of the influence level of the respective given data element by humans. In one example, the first influence value of each given data element may be compared with a first threshold. The given data elements whose first influence values may be greater than the first threshold may be selected as the data element candidates.

According to some embodiments, the evaluation of the second type of usage of each data element of the set of data element candidates comprises determining a second influence value of the respective data element candidate. The second influence value of the respective data element may indicate the influence level of the respective data element with respect to the second type of communication in the communication system. In a manner similar to the first influence value, the second influence value may allow a simple assessment of the influence level of the respective data element candidate by humans. The sorting may be performed with respect to the second influence values of the data element candidates. Preferably, the data element candidates may be listed with a descending order of their second influence values.

Preferably, the first and second influence values may be the only score(s) to assess the influence level of each given data element and each data element candidate, respectively.

According to some embodiments, the communication system comprises a set of machine learning modules and the first or the second type of usage of each data element of the given set of data elements and the set of data element candidates, respectively, comprises an application of the respective data element to at least one of the set of the machine learning modules. With respect to these embodiments and in the following, the term "first type of usage of each data element" refers to the first type of usage of each given data element. Similarly, the term "second type of usage of each data element" refers to the second type of usage of each data element candidate. The application of the respective data element to at least one of the sets of the machine learning modules may be a use of the respective data element for training or testing one, two, or more of the machine learning modules (ML-modules).

The evaluation of the first type of usage of each data element may be performed by calculating the first influence value such that its value corresponds to a number of machine learning modules the respective given data element is applied to. Similarly, the evaluation of the second type of usage of each data element may be performed by calculating the second influence value such that its value corresponds to a number of machine learning modules to which the respective data element candidate is applied. In both cases, a higher value of the first and second influence values may correspond to a higher number of machine learning modules to which the respective data element is applied, compared to a lower value.

The term "machine learning" refers to a computer algorithm used to extract useful information from input datasets and output datasets being related to the input datasets. The machine learning may comprise the operations including, without limitation, training and testing one of the machine learning modules. The input datasets and the output datasets may be constructed on the basis of the given data elements and/or the data element candidates. The information may be extracted by building probabilistic models in an automated way. The machine learning may be performed using one or more known machine learning algorithms such as linear regression, backpropagation, K-means, classification algorithms, etc. Performance of one of the machine learning algorithms is considered to be training. A probabilistic model may, for example, be an equation or set of rules that makes it possible to predict a category from a set of categories on the basis of one of the input datasets or to group an instance corresponding to that input dataset into a cluster. The probabilistic model may be configured to provide a confidence score for each prediction or grouping it performs. The confidence score of the prediction or the grouping may indicate the correctness of the prediction and the grouping, respectively.

In another example, the evaluation of the first type of usage of each data element may be performed by calculating the first influence value such that its value corresponds to a number of categories of the set of categories the respective given data element is applied to perform the prediction on the basis of the respective data element. Similarly, the evaluation of the second type of usage of each data element may be performed by calculating the second influence value such that its value corresponds to a number of categories of the set of categories the respective data element candidate is applied to perform the prediction on the basis of the respective data element.

The term "module" as used herein refers to any known or in the future developed hardware, software (such as an executable program), artificial intelligence, fuzzy-logic, or combination thereof for performing a function associated with the "module" or being a result of having performed the function associated with the "module." For example, one of the ML-modules may be a neuronal network.

The first or second type of communication may be a loading of the given data elements and the data element candidates, respectively, from a first permanent storage device of the communication system to an input channel of one of the ML-modules. In another example, the first or second type of communication may be a processing operation of the training of one of the ML-modules.

The set of machine learning modules may have a strong impact on the communication system. For example, the set of machine learning modules may be designed to perform first decision processes and/or a first data analysis influencing a first further communication in the communication system. The first further communication may be a sending of a result calculated by the set of machine learning modules to an output device, wherein the machine learning modules are in a trained state. A high usage of one of the given data elements or the data element candidates with respect to the set of machine learning modules may correlate to a high importance of that respective data element with regard to the communication system. For that reason, considering the first and second types of usage with respect to the set of machine learning modules may alleviate the sorting.

In another example, the evaluation of the first and/or second type of usage of each data element may be performed by calculating the first and second influence value, respectively, such that its value is equal or directly related to a partial derivative of at least one of the machine learning modules being calculated based on the respective data element. In that way, the first and/or second influence value of the respective data element may be correlated to an impact of the training of the respective machine learning module itself.

According to some embodiments, the communication system comprises data representation elements and the first or second types of usage of each data element of the given set of data elements and the set of data element candidates, respectively, comprises an inclusion of information given by the respective data element in the data representation elements. The data representation elements may be documents, charts, lists, or tables comprising the information of the given data elements and the data element candidates, respectively. The data representation elements may be configured to perform second decision processes and/or a second data analysis, which may influence a second further communication in the communication system. The second further communication may be a visualization of the second decision process and/or the second data analysis by an output device. The second data analysis may be used by humans to perform a human-driven data analysis. Evaluating the first and/or second type of usage with respect to the data representation elements may therefore enable assessment of the importance of the given data elements and the data element candidates, respectively, with reference to visualization elements which are important for human decision making.

The first and/or second influence value of each data element of the given set of data elements and the set of data element candidates, respectively, may be equal to a number of times the given data elements and the data element candidates are included in the data representation elements, respectively. The first and second types of communication may comprise loading the given data elements and/or the data element candidates from a second permanent storage device to a processor of the communication system and creating the data representation elements.

The data representation elements may also comprise links linking the given data elements and/or data element candidates among each other. In this case, the first and/or second influence value(s) of each respective data element may be equal to a number of times the respective data element is used for the linking with respect to the data representation elements.

According to some embodiments, the communication system comprises a software development architecture, and the first or second type of usage of each data element of the given set of data elements and the set of data element candidates, respectively, comprises an application of the respective data element to the software development architecture. Such embodiments may enable assessment of an influence of the given data elements and/or the data element candidates on software development with respect to the communication system. The software development architecture may comprise different software development platforms, preferably comprising each an assigned memory space on a processor and/or different user interfaces being assigned each to a different software developer. The user interfaces may comprise different saved settings and routines being adapted each to one of the software developers. The user interfaces may also be known as "notebooks." By means of the user interfaces and/or the software platforms, a type of application of the given data elements and/or the data element candidates may be determined, preferably by the developers.

The type of application of the given data elements and/or the data element candidates to the software development architecture may be its use as training and/or testing data sets for building data analysis modules. The data analysis modules may comprise the above mentioned machine learning modules. The first and second types of communication may comprise a loading of the given data elements and the data element candidates, respectively, into one or more of the assigned memory spaces. The first and second influence values of each data element of the set of given data elements and the set of data element candidates, respectively, may be equal to a number of times the respective data element is used within the software development architecture, preferably within the different notebooks.

According to some embodiments, the communication system comprises a search engine and the first or second type of usage of each data element of the given set of data elements and the set of data element candidates, respectively, comprises an application of the respective data element to the search engine. Such embodiments may enable assessment of a usage of the respective data elements referring to the search engine. According to such embodiments, the first and second influence values of each data element of the set of given data elements and the set of data element candidates, respectively, may be equal to a number of times the respective data element is referred to in a search performed by the search engine.

The application of the given data elements and/or the data element candidates to the search engine may comprise a generation of a search string which may comprise a name or a further information to specify the respective data elements. The first and/or second types of communication according to such embodiments may be in the form of sending the search string to components of the communication system. The components may comprise the above mentioned machine learning modules. Furthermore, the first and/or second type of communication(s) may comprise a comparison of the search string or the name or the further information to specify the respective data elements with stored search strings.

According to some embodiments, the communication system comprises a connection architecture, and the first or second type of usage of each data element of the given set of data elements and the set of data element candidates, respectively, comprises an application of the respective data element to the connection architecture. The connection architecture may comprise links between the data elements. According to such embodiments, the first and second influence values of each data element of the set of given data elements and the set of data element candidates, respectively, may be equal to a number of times the respective data element is linked to one other data element of the given data elements. Generally, the higher that a particular one of the data elements is connected among the given data elements or the set of data element candidates, the higher a chance that this particular one of the data elements may be important for the communication system. Therefore, such embodiments may alleviate the sorting. The first and second types of communication according to such embodiments may be in the form of sending a content of an exemplary memory space which stores information of a highly connected data element to the components of the communication system processing data elements being linked to the highly connected data element.

Furthermore, such embodiments may enable designing a graph comprising the links. The graph may facilitate visualization of the connections between the data elements in a manner which is easy to understand for humans. For example, a zone of high density within the graph may indicate a region of highly connected data elements, which may have higher importance relative to the rest of the data elements. Therefore, the graph may alleviate the sorting.

According to some embodiments, the communication system comprises a ranking system, and the first or second type of usage of each data element of the given set of data elements and the set of data element candidates, respectively, comprises an application of the respective data element to the ranking system. The application of the respective data element may be in the form of listing the given data elements and the data element candidates respectively in the ranking system. According to such embodiments, the first and second influence values of each data element of the set of given data elements and the set of data element candidates, respectively, may be a ranking number of the respective data element. The first and second types of communication, according to such embodiments, may be a comparison of the ranking number of the given data elements and the data element candidates, respectively, to a given ranking number. This comparison may be performed in response to a request of data elements comprising a ranking number above the given ranking number. The ranking numbers of the data elements may be provided by collecting votes of users. One advantage of the application of the data elements to the ranking system may be that human judgement may be considered in the performance of the sorting.

According to some embodiments, the communication system comprises a set of applications, and the first or second type of usage of each data element of the given set of data elements and the set of data element candidates, respectively, comprises an application of the respective data element to the set of applications. Such embodiments may enable tracking an influence of the respective data elements on the applications of the computer system. Generally, a high use of one of the data elements may indicate a high importance of this data element with respect to the communication system. According to such embodiments, the first and second influence values of each data element of the set of given data elements and the set of data element candidates, respectively, may be equal to a number of times the respective data element is processed by the set of applications. The applications may comprise the above described data analysis modules. The data analysis modules may process the given data elements and/or the data element candidates, preferably by generating further data and/or by visualizing these data elements, for example by generating the above mentioned data representation elements. The first and second types of communication may comprise reading in the given data elements and/or the data element candidates and/or sending the generated further data to components of the communication system.

According to some embodiments, the communication system comprises a nomenclature. The nomenclature comprises terms for describing the data elements. According to these embodiments, the first or second usage of each data element of the given set of data elements and the set of data element candidates, respectively, comprises assigning the respective data element to a selected term of the terms of the nomenclature. In one example, the respective data element may be assigned to more than one selected term of the nomenclature. The selected term or terms may describe the respective data element in an intuitive manner and may help humans to understand a meaning of the respective data element with regard to the communication system. In most cases, the respective data element may be assigned to the selected term or terms by a user of the communication system. A number of terms to which the respective data element is assigned may correlate to an importance of the respective data element. The higher this number, the higher this importance may be.

Such embodiments may alleviate accounting for the importance of the respective data element with respect to the nomenclature. According to such embodiments, the first and second influence values of each data element of the set of given data elements and the set of data element candidates, respectively, may be equal to a number of times the respective data element is assigned to one of the terms of the nomenclature. In addition, the first and/or second influence value may be calculated with respect to different types of terms of the nomenclature. The different types may be categorized according to their importance to the communication system. The first and second types of communication may comprise performing a comparison of a search term with the terms to which the respective data elements are assigned.

According to some embodiments, the evaluation of the first and/or second usage of each data element of the given set of data elements and the set of data element candidates, respectively, is performed by comparing the selected term to which the respective data element is assigned with a further term, wherein a further data element is assigned to the further term and marked as important with respect to the communication system.

As the further data element is marked as important, the chance that the data elements of the given set of data elements and the set of data element candidates which are assigned to the further term are important with reference to the communication system may be high. Therefore, such embodiments may alleviate the sorting. According to such embodiments, the first and second influence values of each data element of the set of given data elements and the set of data element candidates, respectively, may be equal to a number of times the selected term of respective data element is assigned to is equal to the further term. Hence, the first and second influence values of each data element may be zero or one. According to such embodiments, the first and second types of communication may comprise performing a comparison of the further term with the terms to which the respective data elements are assigned.

According to some embodiments, the evaluation of the first and/or second usage of each data element of the given set of data elements and the set of data element candidates, respectively, is performed by comparing the selected term to which the respective data element is assigned with a second further term, the second further term being given by a user of the communication system. Such embodiments may enable inclusion of a knowledge of the user about assessing the importance of the data elements considering the nomenclature. The first and second influence values of each data element of the set of given data elements and the set of data element candidates, respectively, may be equal to a number of times the selected term of respective data element is assigned to is equal to the second further term. According to such embodiments, the first and second types of communication may comprise performing a comparison of the second further term with the selected terms to which the respective data elements are assigned.

According to some embodiments, the communication system comprises governance rules, and the data elements of the given set of data elements are assigned to the governance rules. In such embodiments, the method further includes performing the evaluation of the first or the second types of usage of each data element of the given set of data elements and the set of data element candidates, respectively, with respect to an application of the respective data element to the governance rules. The governance rules may comprise a set of rules determining allowable types of processing the given data elements and/or the data element candidates.

The application of the given data elements and/or the data element candidates to the governance rules may be in the form of assigning the respective data elements to at least one of the governance rules. In response to assigning the respective data elements to at least one of the governance rules, a processing of the respective data elements may be restricted to the assigned governance rules. According to such embodiments, the first and second influence values of each data element of the set of given data elements and the set of data element candidates, respectively, may be equal to a number of times the respective data element is assigned to one of the rules of the governance rules. It may be assumed that the more important a data element is, the more attention may be paid with regards to the governance rules, for example the more governance rules to which it may be assigned. Therefore, such embodiments may alleviate the sorting with respect to the importance of the data elements. The communication system may comprise a server storing information about which data elements may be assigned to which governance rules. The first and/or second type of communication may be sending a request from one of the components of the communication system to the server. The request may comprise a requested type of data processing with respect to a chosen data element of the given set of data elements. The requested type of data processing may be approved or not approved according to the governance rules to which the chosen data element may be assigned.

According to some embodiments, the governance rules include a protection rule relating to a protection of the data element of the given set of data elements which is assigned to the protection rule. The governance rules may not only restrict the data processing of the data elements within the communication system, but may also result in protection algorithms according to the protection rule when the given data elements and/or the data element candidates are processed in the communication system.

The protection algorithms may comprise encrypting the information of the given data elements and/or the data element candidates and/or restricting sending these data elements to particular components of the communication system or external components. The first and/or second type of communication may comprise sending a public key from one of the components of the communication system to a further component of the communication system. Data elements which are highly protected tend to have a higher importance in the communication system. Therefore, such embodiments may alleviate the sorting. According to such embodiments, the first and second influence values of each data element of the set of given data elements and the set of data element candidates, respectively, may be equal to a number of times the respective data element is assigned to one of the governance rules which relates to data protection.

According to some embodiments, the first threshold may vary according to the above described variants of the first usage of the given data elements. The first threshold may be adaptable by a user of the communication system. Alternatively, or additionally, the first threshold may be determined dependent on at least an influence value of a marked data element, wherein the marked data element may be marked as important for the communication system. In another example, the first threshold may be calculated dependent on a mean value of influence values of marked data elements. Similarly, the marked data elements may be marked as important for the communication system. The influence value of the marked data element or the influence values of marked data elements may be determined by evaluating the same type of usage of the marked data element and the marked data elements, respectively, as that type of usage which may be evaluated when determining the first influence values of the given data elements. Hence, a method for calculating the influence value of the marked data element or the influence values of marked data elements may be the same as a method for calculating the first influence values for the given data elements.

According to some embodiments, the method further comprises determining an overall usage score for each data element of the set of data element candidates dependent on multiple different types of usages of the respective data element, wherein the multiple different types of usages comprise at least the first and the second types of usage, and the overall usage score indicates an overall influence level of the respective data element with respect to the communication system. According to such embodiments, the sorting is performed on the basis of the overall usage score for each data element of the set of data element candidates. According to such embodiments, or in general, the first usage and/or the second usage may be in the form of a first aggregation of different types of usages of the given data elements and a second aggregation of further different types of usages of the data element candidates, respectively. The different types of usages of the first aggregation may each comprise one of the above described variants the first usage may comprise. Similarly, the further different types of usages of the second aggregation may each comprise one of the above described variants the second usage may comprise. A number of the different types of usages and a number of the further different types of usages may be in a range of one to ten.

The overall usage score for each data element candidate may be calculated by determining a weighted sum of the first influence value, the second influence value, and, preferably, at least a first further influence value of the respective data element candidate. For example, the overall usage score of each data element candidate may be calculated as a weighted sum of the first, the second, preferably the first further, and preferably a second, third, fourth, fifth, sixth, seventh, and/or eighth further influence value of the respective data element candidate.

The first, second, and the first, second, third, fourth, fifth, sixth, seventh, and/or eighth further influence value(s) of each data element candidate may each be determined according to one of the above described embodiments describing the determination of the first and/or second influence value of each given data element and each data element candidate, respectively.

For example, the first, second, and the first, second, third, fourth, fifth, sixth, seventh, and/or eighth further influence value of each data element candidate may be equal to or may correlate to: the number of times the respective data element candidate is assigned to one of the terms of the nomenclature; the number of machine learning modules to which the respective data element candidate is applied; the number of times the respective data element candidate is used for the linking; the number of times the respective data element candidate is used within the software development architecture; the number of times the respective data element candidate is used in the search performed by the search engine; the number of times the respective data element candidate is linked to one other data element of the given data elements; the ranking number of the respective data element candidate; the number of times the respective data element candidate is processed by the set of applications; the number of times the respective data element candidate is included in the data representation elements; or the number of times the respective data element candidate is assigned to one of the rules of the governance rules.

The sorting may be performed with respect to the overall usage score of the data element candidates. Preferably, the data element candidates may be listed with a descending order of their overall usage score. The multiple different types of usages may comprise at least three different types of usages. The more different types of usages are considered for the sorting, the more accurately the importance of each data element candidate may be assessed. The three different types of usages may comprise the above described variants of usage the first and the second type of usage.

According to some embodiments, the method further comprises displaying metadata of the data elements of the set of data element candidates for selecting a portion of the sorted data elements of the set of data element candidates for the request for the data processing. The metadata comprises information related to a generation of the overall usage score of the respective data element. Such embodiments may enable a user to understand the generation of the overall usage score of the respective data element candidate. The metadata may comprise the single value of the first, second, further, second further, third further, fourth further, fifth, sixth, seventh, and/or eighth further influence value of each data element candidate. The user may use the metadata to select the portion of the sorted data element candidates.

Figure 2:
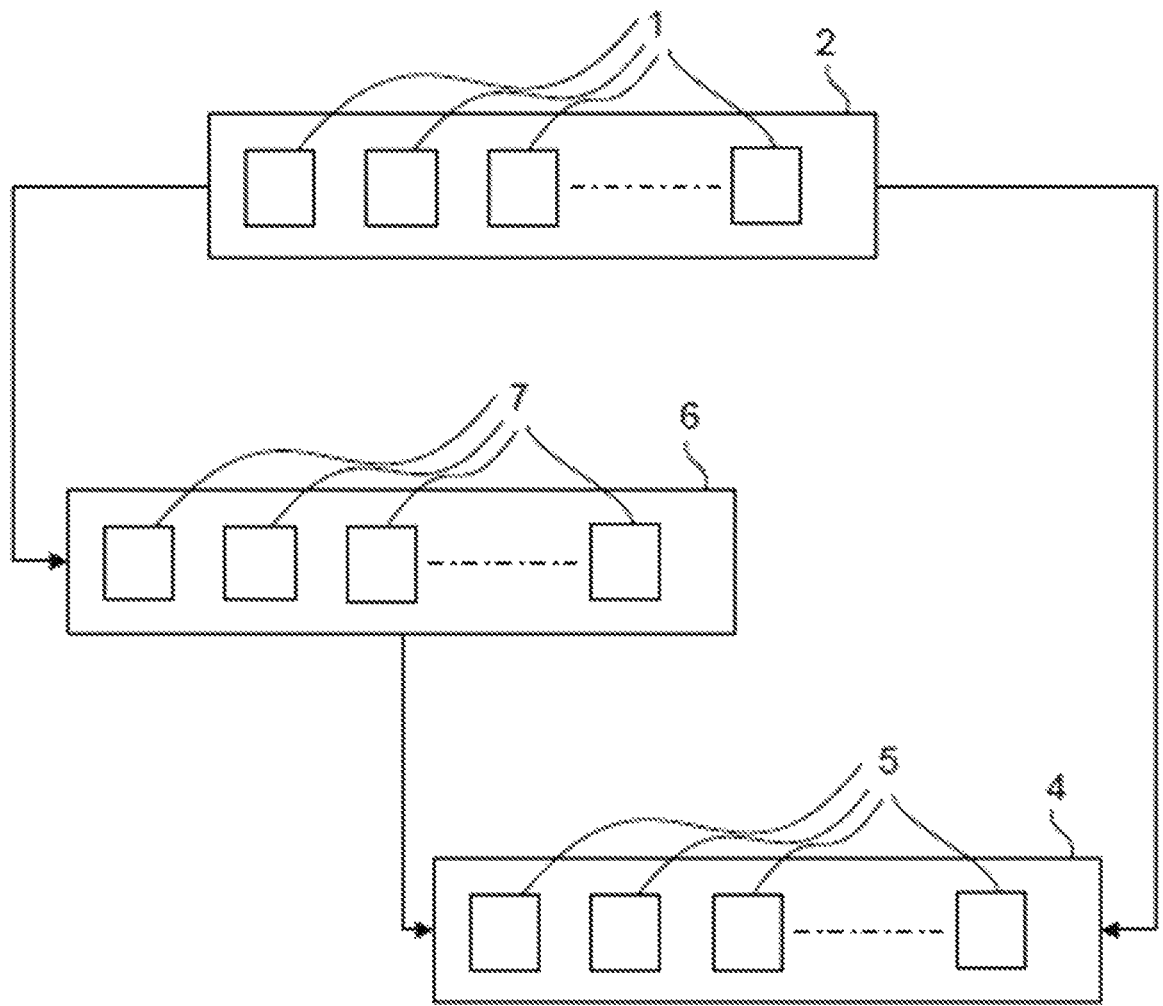
FIG. 2 depicts a given set of data elements, data element candidates, and a second given set of data elements, in accordance with embodiments of the present disclosure.
Figure 3:
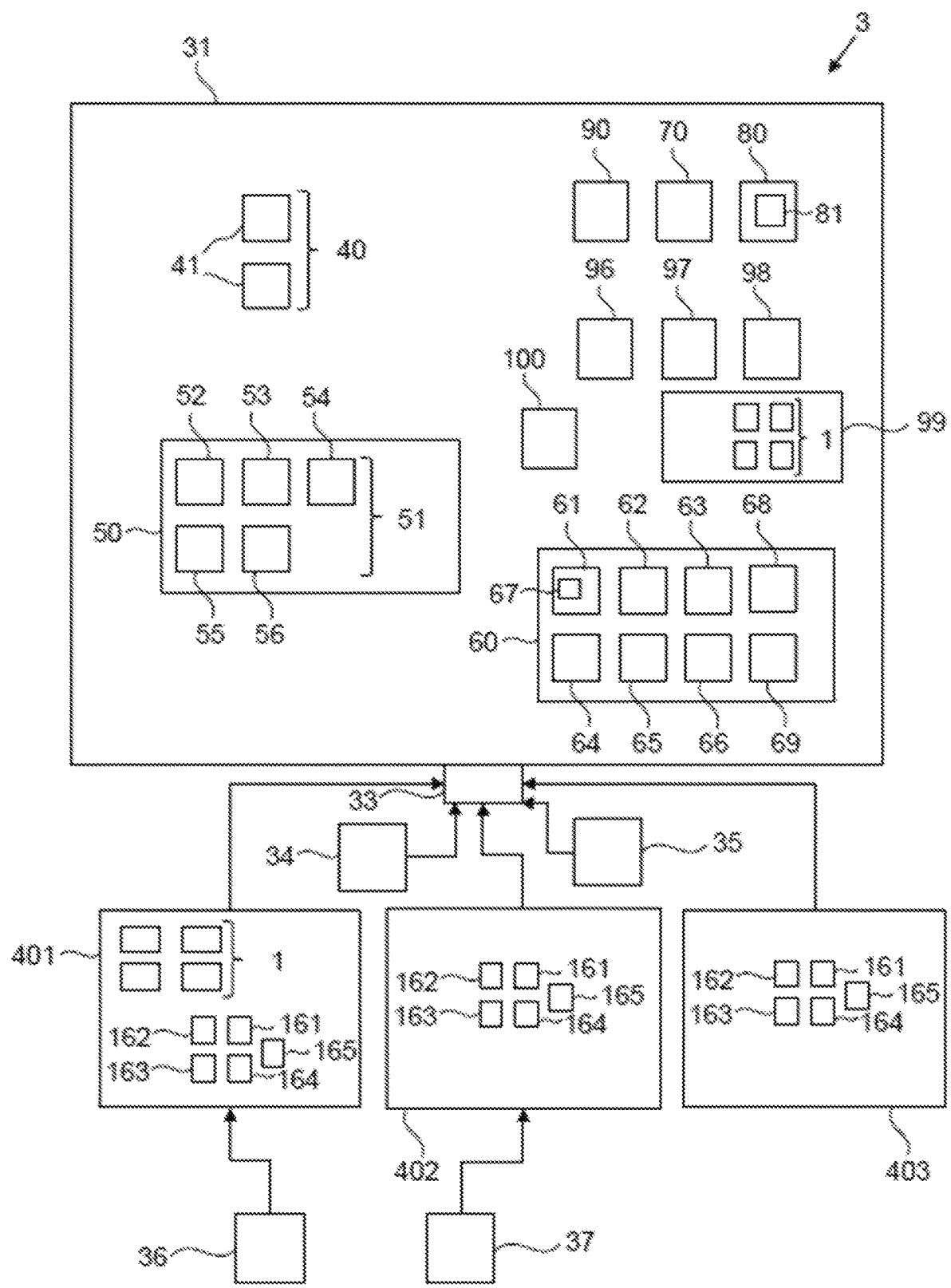
FIG. 3 depicts a block diagram for a communication system, in accordance with embodiments of the present disclosure.

Turning now to the figures, FIG. 1 shows a first computer system 100 for sorting data elements 1 (shown in FIG. 2) of a given set 2 (shown in FIG. 2) of data elements of a communication system 3 (shown in FIG. 3). The first computer system 100 may be suited for performing method operations as set forth in the disclosure. The first computer system 100 may include a first processor 102, a first memory 103, a first I/O circuitry 104 and a first network interface 105 coupled together by a first bus 106.

The first processor 102 may represent one or more processors (e.g. microprocessors). The first memory 103 may include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). In some embodiments, the first memory 103 may have a distributed architecture, where various components are situated remotely from one another, but may be accessed by the first processor 102.

The first memory 103 in combination with a first persistent storage device 107 may be used for local data and instruction storage. Preferably, the given set 2 (shown in FIG. 2) of data elements may be stored in the first persistent storage device 107. The first persistent storage device 107 includes one or more persistent storage devices and media controlled by the first I/O circuitry 104. The first persistent storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

The first memory 103 may include one or more separate programs, each of which comprises an ordered listing of executable instructions for implementing logical functions, notably functions involved in examples. The software in the first memory 103 may also include a first suitable operating system (OS) 108. The first OS 108 essentially controls the execution of other computer programs for implementing at least portions of methods as described herein.

The first computer system 100 may be configured for performing an evaluation of a first type of usage of each data element 1 of the given set 2 of data elements (shown in FIG. 2), which may be referred to herein as a first function. A result of each evaluation of the first type of usage of the respective data element 1 may indicate an influence level of the respective data element 1 with respect to a first type of communication in the communication system 3 (shown in FIG. 3). The first type of usage may be in the form of one of the above described types of the first type of usage.

Furthermore, the first computer system 100 may be configured for performing a comparison of the results of the evaluations of the first type of usage of the data elements 1 of the given set 2 of data elements among each other, which may be referred to herein as a second function.

Furthermore, the first computer system 100 may be configured for determining a set 4 (shown in FIG. 2) of data element candidates for the sorting dependent on a result of the comparison of the results of the evaluations of the first type of usage, which may be referred to herein as a third function. The set 4 of data element candidates may be a proper subset of the given set 2 of data elements.

Furthermore, the first computer system 100 may be configured performing an evaluation of a second type of usage of each data element 5 (shown in FIG. 2) of the set 4 of data element candidates, which may be referred to herein as a fourth function. A result of each evaluation of the second type of usage of the respective data element candidate 5 may indicate an influence level of the respective data element candidate 5 with respect to a second type of communication in the communication system 3 (shown in FIG. 3). The second type of usage may be in the form of one of the above described types of the second type of usage.

Furthermore, the first computer system 100 may be configured for sorting the data elements 5 of the set 4 of data element candidates dependent on a result of the comparison of the results of the evaluations of the second type of usage, which may be referred to herein as a fifth function. The sorting may be performed according to one of the above described variants.

Furthermore, the first computer system 100 may be configured for providing the sorted data elements 5 of the set 4 of data element candidates, which may be referred to herein as a sixth function.

Furthermore, the first computer system 100 may be configured for receiving a request for a data processing based on the provided sorted data elements 5 of the set 4 of data element candidates, which may be referred to herein as a seventh function. The first computer system 100 may receive the request in response to the providing of the sorted data elements 5 of the set 4 of data element candidates.

The first computer system 100 may perform the first, second, third, fourth, fifth, sixth, and seventh functions by executing a first program 201, a second program 202, a third program 203, a fourth program 204, a fifth program 205, a sixth program 206, and a seventh program 207, respectively. The first processor 102 may execute a main program 200. The main program 200 may initiate an execution of the program 201, 202, 203, 204, 205, 206, and 207 (or additional program, such as 208 and 209) on the first processor 102.

The term "program" as used herein refers to a set of instructions which contains commands to initiate actions performed by the first processor 102 when the first processor 102 may read the commands. The set of instructions may be in the form of a computer-readable program, routine, subroutine or part of a library, which may be executed by the first processor 102 and/or may be called by a further program being executed by the first processor 102. Preferably, the programs 200, 201, 202, 203, 204, 205, 206, and 207 may be executable programs which are compiled according to a type of hardware platform of the first computer system 100. The first memory 103 may comprise a space for storing the programs 200, 201, 202, 203, 204, 205, 206, 207. The space may be referred to hereinafter as first function memory 115.

FIG. 3 shows the communication system 3 which may comprise a central unit 31 and several user workstations. The central unit 31 may comprise components such as: the first computer system 100; a set 40 of different machine learning modules 41; a first storage device 50, which may store data representation elements 51; a software development architecture 60; a search engine 70; a ranking system 80; and a nomenclature archive 90 for storing and preferably maintaining a nomenclature. The nomenclature may comprise terms for describing the data elements 1, preferably with respect to their usage within in communication system 3.

The set 40 of machine learning modules may be the set of machine learning modules described above. For example, the above mentioned input datasets and the output datasets of the machine learning modules 41 may be constructed on the basis of the given set 2 of data elements and/or the set 4 of data element candidates. The first storage device 50 may store documents 52, charts 53, lists 54, reports 55 about past communications in the communication system 3, or tables 56 as data representation elements 51. The reports 55 may comprise a set of diagnoses about an unsuccessful part of the past communications and a successful part of the past communications.

The software development architecture 60 may comprise: a first software development platform 61 for developing the machine learning modules 41; a second software development platform 62 for developing a first application 161 for generating at least one of the data representation elements 51; a third software development platform 63 for developing a second application 162 for using the search engine 70; a fourth software development platform 64 for developing a third application 163 for using the ranking system 80; a fifth software development platform 65 for developing a fourth application 164; and/or a sixth software development platform 66 for developing a fifth application 165.

The fourth application 164 may be software directed to a technical purpose, for example construction of engineering parts or simulation of fluid flows. The software development platforms 61, 62, 63, 64, 65, 66 may each use a different memory space on the first persistent storage device 107 and on the first memory 103 (shown in FIG. 1). Furthermore, the software development platforms 61, 62, 63, 64, 65, 66 may each be assigned to a first developer workstation 34 and/or a second developer workstation 35.

Furthermore, the communication system 3 may comprise a first application server 401, a second application server 402, and a third application server 403. The first, second, third, fourth, and fifth applications 161, 162, 163, 164, 165 may be installed on each of the first, second and third application servers 401, 402, 403. The application servers 401, 402, 403 may comprise a first, second, and third connection to the central unit 31, respectively, and further connections to at least one of the user workstations 34, 35, and/or a first end user workstation 36 and a second end user workstation 37. In some embodiments, each connection of the application servers 401, 402, 403 to the central unit 31 may enable a connection of the application servers 401, 402, 403 to the components of the central unit 31, preferably realized by a central communication port 33 of the central unit 31.

The communication system 3 may be used in the following manner. The fourth application 164 may be controlled and run by means of using the first end user workstation 36, which may be connected to the first application server 401. In response to running the fourth application 164, preferably on the first application server 401, the data elements 1 may be generated, preferably on the first application server 401. The first end user workstation 36 may be controlled by a first end user, for example an engineer. The fourth application 164 may generate the data elements 1 in a structured manner, and the data elements 1 may comprise different partitions, for example a first, second, third, and fourth partition.

The data elements 1 may be labelled according to the nomenclature of the communication system 3 and their usage in the communication system 3. Depending on the technical purpose of the fourth application 164, the terms of the nomenclature may differ. In the following example, a fluid flow simulation of technical objects exposed to a fluid flow is used illustratively as the technical purpose. Hence, if the fourth application 164 is run, the fluid flow simulation is performed. According to this example, the nomenclature may include terms such as "CAD-data," "inflow velocity," "outflow velocity," "number of nodes," "number of elements," "fluid flow solution," "pressure on first surface," "pressure on second surface," "boundary conditions," and "fluid flow data."

At least a portion of the data elements 1 may be assigned to at least one of the terms by using the first end user workstation 36. In one example, the first end user may assign the terms to the data elements 1. However, in another example the data elements 1 may be assigned to the terms automatically, for example by running a shell script on the first end user workstation 36. The data elements 1 may be assigned to two or three terms. For example, one of the data elements 1 may be assigned to the term "fluid flow data," "boundary conditions," and "inflow velocity." Assigning each of the data elements 1 to the terms may be referred to as labelling and may be regarded as one type of usage of each data element 1 hereinafter. If one of the data elements 1 may be not assigned to one of the terms, this may be regarded as a void assignment to the nomenclature. Thus, the usage of all the data elements 1 with respect to the nomenclature may be compared. The labelling may be performed using the fourth application 164, preferably in combination with running the above mentioned shell script.

The nomenclature may comprise at least one hierarchy. The hierarchy may comprise different levels indicated for example by a parent term, child terms of first generation, and, preferably, child terms of second generations. According to the above mentioned example the term "fluid flow data" may be a first parent term, the term "boundary conditions" may be a child term of first generation and/or a second parent term, and the term "inflow velocity" may be a child term of second generation. Similarly, the term "fluid flow solution" may be a child term of first generation and/or a third parent term, and each of the terms "pressure on first surface" and "pressure on second surface" may be a child term of second generation.

The nomenclature archive 90 may store the terms of the nomenclature, their level of hierarchy, and/or relationships between these terms. Considering the relationships, the nomenclature archive 90 may store that the term "boundary condition" is a child term of the first parent term "fluid flow data" and that the term "inflow velocity" is a child term of the second parent term "boundary condition." Similarly, the nomenclature archive 90 may store that the term "fluid flow solution" is a child term of the first parent term "fluid flow data" and that each of the terms "pressure on first surface" and "pressure on second surface" is a child term of the third parent term "fluid flow solution."

Considering the levels of hierarchy, the nomenclature archive 90 may store that the term "fluid flow data" is assigned to a first level comprising proper parents, that each of the terms "boundary condition" and "fluid flow solution" are assigned to a second level comprising children of first generation, and that each of the terms "inflow velocity," "pressure on first surface," and "pressure on second surface" are assigned to a third level comprising children of second generation. The phrase "proper parent" refers to a term of the first level that does not have parents and therefore cannot be a child of another term.

The fourth application 164 may generate the data elements 1 such that: the data elements 1 which are assigned to the term "CAD-data" belong to the first partition; the data elements 1 which are assigned to the term "boundary condition" belong to the second partition; the data elements 1 which are assigned to the terms "number of nodes" and "number of elements" belong to the third partition; and the data elements 1 which are assigned to the term "fluid flow solution" belong to the fourth partition.

The first end user workstation 36 may initiate a running of the third application 163 on the first application server 401 for using the ranking system 80. In response, ranking values may be assigned to each one of the above mentioned partitions, and by doing so, ranking values may be assigned to the data elements 1 which belong to the respective partition, by means of controlling the third application 163 via the first end user workstation 36. For example, a ranking value of "0.9" may be assigned to the first partition, a ranking value of "0.8" may be assigned to the second partition, a ranking value of "0.3" may be assigned to the third partition, and a ranking value of "1.0" may be assigned to the fourth partition. A ranking value of "1.0" may correspond to the highest possible importance of the data elements belonging to the partition to which this ranking value is assigned. The importance refers to an importance to the communication system 3. Accordingly, a ranking value of "0.0" may correspond to the lowest possible importance of the data elements belonging to a partition to which this ranking value is assigned.

Alternatively, or additionally, ranking values may be assigned to at least one of the data elements 1 by means of controlling the third application 163 via the first end user workstation 36.

The first application server 401 may perform a communication with the ranking system 80 by running the third application 163. Via this communication, entries in a ranking database 81 may be generated, the entries assigning ranking numbers from "0.0" to "1.0" to each of the data elements 1, preferably with respect to the partition to which they belong. In one example, the ranking values assigned to the first, second, third, and fourth partitions may be transferred to the ranking system 80. The generation of the entries may be referred to hereinafter as ranking. The ranking may also comprise assigning the ranking values to the partitions. Performing the ranking may be considered a first further type of usage of each data element of the data elements 1.

The fifth application 165 may be software for performing a data management in the communication system 3. The data management may comprise processing and/or transferring the data elements 1 from one of the application servers 401, 402, 403 to the central unit 31, preferably to a data server 99 of the central unit 31. The fifth application 165 may be controlled by the second end user workstation 37. The second end user workstation 37 may be controlled by a second end user, for example a data steward.

The data elements 1 may be processed differently according to governance rules of the communication system 3. In one example, the governance rules may provide a restriction to the data elements 1 dependent on the term of the nomenclature to which they are assigned. For example, the data elements 1 may be accessible to a selected portion of users in the communication system 3 dependent on the term of the nomenclature to which they are assigned. In another example, the governance rules may permit only a set of actions which may be applied on the data elements 1 dependent on the term of the nomenclature to which they are assigned.

In another example, the governance rules may provide conditions which need to be fulfilled if a certain action may be applicable to the data elements 1 dependent on the term of the nomenclature to which they are assigned. For example, the governance rules may comprise a protection rule relating to a protection of a selected portion of the data elements 1. For example, the data elements 1 belonging to the first partition (for example, the ones labelled as "CAD-data") may be assigned to the protection rule by using the fifth application 165, preferably by the data steward. The protection rule may determine that each one of the data elements 1 being assigned to the protection rule is to be encrypted before being transferred from the first application server 401 to the central unit 31. Referring to the above described example, the data elements 1 that are assigned to the term "CAD-data" then need to be encrypted before being transferred to the central unit 31. Thus, the CAD-data may be protected. Assigning governance rules to each of the data elements 1 may be referred to hereinafter as governing and may be considered a second further type of usage of each data element of the data elements 1.

By means of the first software development platform 61, at least one of the machine learning modules 41 may be generated, preferably by training this machine learning module using the input and output datasets. The first software development platform 61 may be controlled by the first developer workstation 34 and/or the second developer workstation 35, which may be controlled by a first and a second software developer, respectively. The first software development platform 61 may comprise a data analysis module 67 for selecting the input and output datasets from the data elements 1.

The data analysis module 67 may enable the first and second software developers to analyze a space being spanned by values of the data elements 1. By using the data analysis module, a selection of parts of the data elements 1 which may be used to generate the input and output datasets may be performed. The data analysis module may be designed to perform methods of design of experiment. The methods of design of experiment may automatically perform the selection of the portions of the data elements 1 dependent on a type of a mathematical model the machine learning modules 41 may comprise. These selected portions of the data elements 1 are referred to hereinafter as a fifth partition.

In one example, the first developer workstation 34 may perform a different selection of the portions of the data elements 1 to be used as the input and output datasets. This may happen due to the first and second software developer using the data analysis model differently. The different selections of portions of the data elements 1 may be regarded each as a different application of the data elements 1 to the software development architecture 60. If one of the data elements 1 is not selected, this may be considered a void application with respect to the software development architecture 60. The application of each data element 1 to the software development architecture 60 may be considered a third further type of usage of each data element of the data elements 1.

The software development architecture 60 may comprise a first user interface 68 connecting the first developer workstation 34 with the software development architecture 60, preferably only with the first software development platform 61. The software development architecture 60 may also comprise a second user interface 69 connecting the second developer workstation 35 with the software development architecture 60, preferably only with the first software development platform 61.

Additionally, the first software development platform 61 may generate the machine learning modules 41 such that they each comprise different mathematical models. The mathematical models may comprise polynomial models and/or neuronal networks, such as multi-layer-perceptron networks or radial basis function networks. In one example, the different machine learning modules 41 may be trained with different input and output datasets, preferably dependent on the type of mathematical model of each machine learning module of the machine learning modules 41. This example describes one possible application of each of the data element 1 to at least one machine learning module of the set 40 of the machine learning modules 41 and may be considered a fourth further type of usage of each data element of the data elements 1.

The communication system 3 may comprise a fourth connection between the first end user workstation 36 and the second server 402. The first end user workstation 36 may perform a controlling of the first application 161 for generating the data representation elements 51 on the second server 402, preferably initiated by commands sent by the first end user via the fourth connection. The controlling of the first application 161 may comprise selecting a portion of the data elements 1 such that information given by the selected portion of the data elements 1 may be included in at least one of the data representation elements 51. The selected portion of the data elements 1 may be referred to hereinafter as a sixth partition. Such an inclusion of information given by the respective data elements of the sixth partition may be considered a fifth further type of usage of each data element of the data elements 1.

The communication system 3 may comprise a fifth connection between the first end user workstation 36 and the third server 403. The first end user workstation 36 may perform a controlling of the second application 162 for using the search engine 70, preferably initiated by further commands sent by the first end user via the fifth connection. The controlling of the second application 162 may comprise generating a search string comprising a name or further information to describe at least one of the data elements 1 to be searched for, referred to hereinafter as a searched data element. The search engine 70 may perform a comparison of the search string with the terms of the nomenclature being assigned to the searched data element. Such a comparison may be considered a sixth further type of usage of each data element of the data elements 1.

In one example, the search engine 70 may use the different levels of hierarchy and relationships to which the data elements 1 are assigned for finding the data elements 1 to be searched for. The second application 162 may display the data elements 1 which may match the search string and preferably the information about the levels of hierarchy and the relationships to which these data elements 1 are assigned.

In another example, the communication system 3 may comprise a connection architecture. The connection architecture may enable linking the data elements 1 among each other. For example, an application of the data elements 1 to the connection architecture may be in the form of linking the data elements 1 belonging to the first partition with the data elements 1 belonging to the second partition. With respect to the above described example of the fluid flow simulation, such a type of linking may be considered assigning certain boundary conditions to certain portions of the CAD-data. The application of the data elements 1 to the connection architecture may be considered a seventh further type of usage of each data element of the data elements 1.

Figure 4:
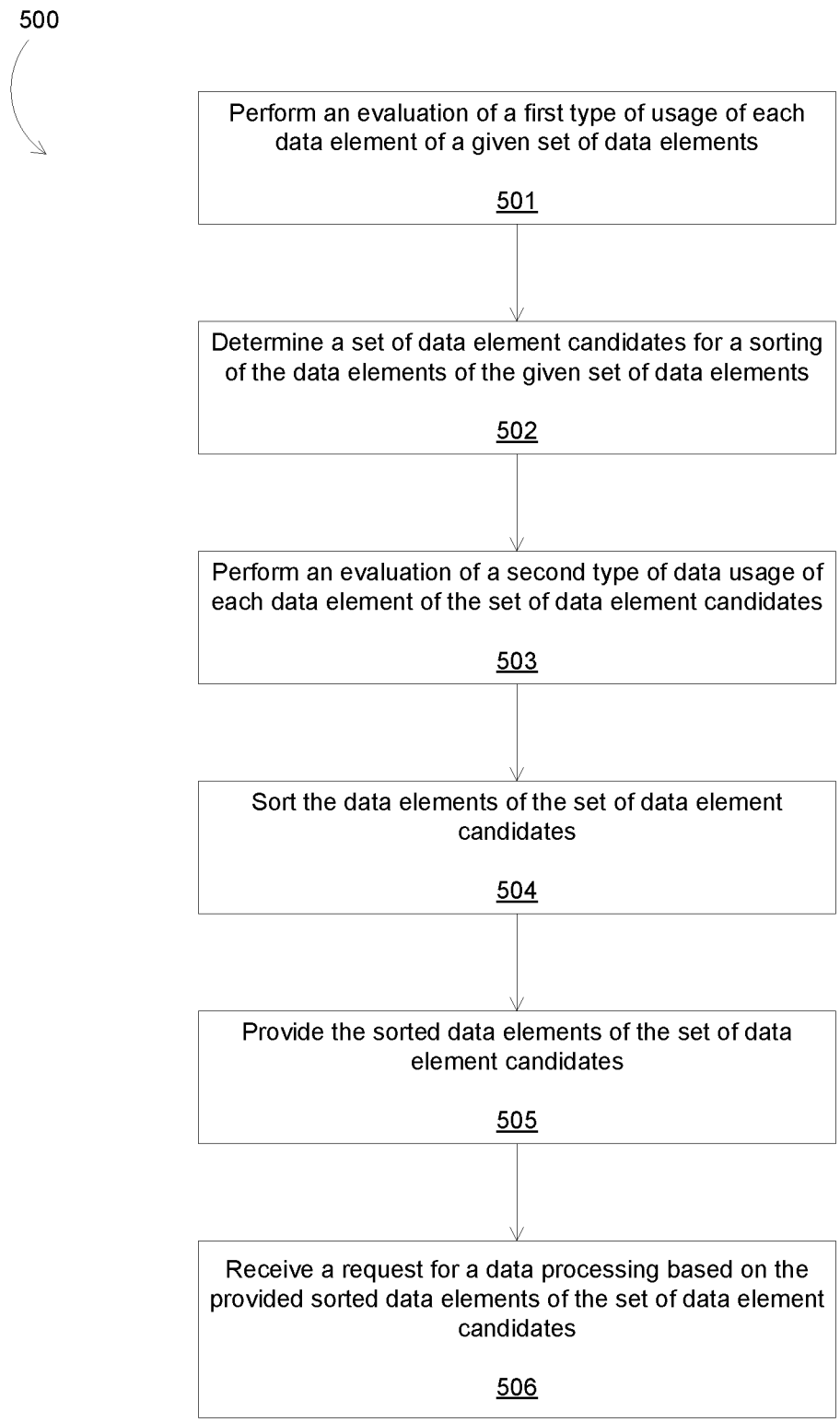
FIG. 4 shows a flowchart of a computer implemented method for sorting the data elements of the given set of data elements shown in FIG. 2 using the communication system shown in FIG. 3, in accordance with embodiments of the present disclosure.

FIG. 4 shows a flowchart of a computer implemented method 500 for sorting the data elements of the given set 2 of data elements. The method comprises the operations described in detail below.

In operation 501, an evaluation of a first type of usage of each data element of the given set 2 of data elements 1 is performed. The first type of usage may be: labelling; ranking, also referred to as the first further type of usage; governing, also referred to as the second further type of usage; the third; fourth; fifth; sixth; or seventh further type of usage. More specifically, the evaluation of the first type of usage of each data element of the given set 2 may be performed by calculating a first influence value for each data element of the given set 2. The first influence value may be equal to the number of times the respective data element of the given set 2 may be applied with respect to the labelling, the ranking, the governing, the third, fourth, fifth, sixth, or the seventh further type of usage. If a single data element of the given set 2 may not be applied to any of these usages, then the respective the first influence value may be zero.

A result of the evaluation of the first type of usage of each of the data elements of the given set 2 may indicate an influence level of the respective data element with respect to one of the above described variants of the first type of communication in the communication system 3.

In one example, a comparison of the results of the evaluations of the first type of usage of the data elements 1 of the given set 2 of data elements 1 among each other may be performed. For example, if for each data element of the given set 2 the first influence value may be calculated, the first influence values of the data elements of the given set 2 may be compared among each other.

In operation 502, the set 4 of data element candidates for the sorting may be determined dependent on the evaluation of the first type of usage of each data element of the given set 2 of data elements. The set 4 of data element candidates may be a proper subset of the given set 2 of data elements. For example, the set 4 of data element candidates may be constructed by selecting the data elements of the given set 2 comprising the highest first influence values and such that the set 4 of data element candidates may comprise less than ten percent of the data elements of the given set 2.

In operation 503, an evaluation of a second type of usage of each data element of the set 4 of data element candidates may be performed. The second type of usage may be: the labelling; the ranking, also referred to as the first further type of usage; the governing, also referred to as the second further type of usage; the third; fourth; fifth; sixth; or seventh further type of usage. The evaluation of the second type of usage of each data element of the set 4 of data element candidates may be performed by calculating a second influence value for each data element of the set 4 of data element candidates. The second influence value may be equal to the number of times the respective data element of the set 4 of data element candidates may be applied to the labelling, the ranking, the governing, the third, fourth, fifth, sixth, or the seventh further type of usage. If a single data element of the set 4 of data element candidates may not be applied to any of these usages, then the respective the second influence value may be zero.

A result of the evaluation of the second type of usage of each of the data elements of the set 4 of data element candidates may indicate an influence level of the respective data element with respect to one of the above described variants of the second type of communication in the communication system 3.

In one example, a comparison of the results of the evaluations of the second type of usage of the data elements of the set 4 of data element candidates among each other may be performed. For example, if for each data element of the set 4 of the data element candidates the second influence value may be calculated, the second influence values of the data elements of the set 4 of the data element candidates may be compared among each other.

In operation 504, a sorting of the data elements of the set 4 of data element candidates may be performed dependent on the evaluation of the second type of usage of each data element of the set 4 of data element candidates. For example, the data elements of the set 4 of data element candidates may be sorted in descending order according to their second influence values.

In operation 505, the sorted data elements of the set 4 of data element candidates may be provided. For example, the sorted data element of the set 4 may be stored in the data server 99.

In operation 506, in response to the providing of the sorted data elements of the set 4 of data element candidates, a request for a data processing based on the provided sorted data elements of the set 4 of data element candidates may be received. The request may be sent from the first developer workstation 34 and/or the second developer workstation 35. The first and/or second software developer may examine the sorted data elements for selecting a portion of the sorted data elements for improving one of the machine learning modules 41. This selected portion may be referred to hereinafter as the seventh partition of the data elements 1. The method may enable the creation of the sorted data elements automatically considering any of the above described usages of the data elements 1, as the operations 501, 502, 503, 504, 505, 506 may be performed automatically.

In the following, a first variant of the method is described, wherein the first usage of the data elements 1 may comprise the labelling. One possible advantage of the labelling being the first usage is that the labelled data elements 1 may be compared with a second given set 6 (shown in FIG. 2) of data elements 7 (shown in FIG. 2), wherein the data elements 7 of the second set 6 may be assigned to at least one of the terms of the nomenclature and may be marked as important for the communication system 3. In one example, the second given set 6 of data elements may be generated before initiating operation 501.

In a manner similar to the data elements 1, a third set of data elements may be generated by the fourth application 164 running a further fluid flow simulation. Similarly, the data elements of the third set may be divided into partitions and assigned to different terms of the nomenclature and to different ranking values. The third set of data elements may comprise the second set 6 of data elements 7. A marking as important for the communication system of one of the data elements 7 of the second set 6 may be performed by assigning the ranking value of "0.8" or higher to the respective data element. In one example, the data elements 7 of the second set 6 may be assigned to the term "boundary condition" and the ranking value "0.8." The data elements 7 of the second set 6 may be also assigned to various different terms of the nomenclature.

In one example, all data elements of the given set 2 which are assigned to at least one of the terms being equal to one of the terms that the data elements 7 of the second set 6 are assigned to may be determined to be data element candidates 5.

In a further example, all data elements of the given set 2 which are assigned to at least one of the terms being equal to one of the terms of a transitive closure of one of the terms that the data elements 7 of the second set 6 are assigned to may be determined to be data element candidates 5. The respective transitive closure of the terms that the data elements 7 of the second set 6 are assigned to may comprise parent and child terms of these terms. For example, the transitive closure of the term "boundary condition" may comprise the term "inflow velocity" as the child term and the term "fluid flow data" as the parent term of the term "boundary condition." The transitive closure of the terms that the data elements 7 of the second set 6 are assigned to may also comprise synonyms of these terms. The nomenclature archive 90 may store the transitive closures of the terms that the data elements 7 of the second set 6 are assigned to. The transitive closures may be adaptable, preferably by the first end user, according to the technical purpose of the fourth application 164.

In a further example, the evaluation of the first usage of each data element of the given set 2 of data elements may be performed by comparing the term to which the respective data element is assigned with a third further term. The third further term is given by a user of the communication system 3. If the term that the respective data element of the given set 2 is assigned to is equal to the third further term, then the respective data element may be determined to be one of the data element candidates 5.

Alternatively, the evaluation of the first usage of each data element of the given set 2 of data elements may be performed by comparing the term to which the respective data element is assigned with terms of a transitive closure of the third further term. If the term that the respective data element of the given set 2 is assigned to is equal to one of the terms of the transitive closure of the third further term, then the respective data element may be determined to be one of the data element candidates 5. The transitive closure of the third further term may be determined similarly to the respective transitive closure of the terms to which the data elements 7 of the second set 6 are assigned.

Determining the data element candidates 5 by considering the labelling with respect to the first usage of the data elements 1 may reduce the computational resources needed for the evaluation of the first usage compared to considering, for example, the application to the machine learning module 41 with respect to the first usage. Similarly, the ranking, the governing, or the application of the data elements 1 to the search engine 70 may be comprised by the first usage in the sense of this method in order to keep the computational costs as low as possible.

The labelling, the ranking, the governing, and the application of the data elements 1 to the search engine 70 may also be combined to determine the data element candidates 5. In such instances, functional data elements may be determined by considering the labelling with respect to the first usage of the data elements 1 in an intermediate step. In this example, the term to which each data element of the given set 2 of data elements is assigned may be compared with terms of a transitive closure of the third further term. If the term that the respective data element of the given set 2 is assigned to is equal to one of the terms of the transitive closure of the third further term, then the respective data element may be marked as one of the functional data elements.

The functional data elements may be used to determine the data element candidates 5. For example, the evaluation of the first usage of the given data elements 1 or only of the functional data elements may be performed with respect to the ranking, the governing, and/or the application of the given data elements 1 or the functional data elements to the search engine 70, as described above. In this variant, the first threshold may be determined dependent on a mean value of influence values of the functional data elements. The influence values of the functional data elements may be determined by evaluating the same type of usage of the functional data elements as that type of usage which may be evaluated when determining the first influence values of the given data elements 1. Hence, a method for calculating the influence value of the functional data elements may be the same as a method for calculating the first influence values for the given data elements 1, in this case. Determining the functional data elements in the intermediate step may be advantageous if the above mentioned marked data elements may not be available for determining the first threshold.

In case the ranking may be comprised by the first usage, the data element candidates 5 may be determined by selecting the data elements 1 that are ranked higher than a given ranking value in the ranking database 81. Additionally, or alternatively, the data element candidates 5 may be determined by selecting that portion of the data elements 1 which comprises ranking values being calculated on the basis of at least a given number of users. The given ranking value and the given number of users may be adaptable to the technical purpose of the fourth application 164.

Determining the data element candidates 5 by the evaluation of the first usage considering the labelling, the ranking, the governing, and the application of the data elements 1 to the search engine 70, as described above, may be referred to herein as a data element candidate production method with respect to the labelling, the ranking, the governing, and the search engine 70, respectively. For each data element candidate production method, the first threshold may be determined, preferably either by using the marked data elements or the functional data elements, as described above.

The communication system 3 may comprise a display 97 (shown in FIG. 3), configured to show information about at least one of the data element candidate production methods, such as each first threshold of the data element candidate production method and/or a corresponding number of possible data element candidates which may be gained by selecting the respective data element candidate production method. The communication system 3 may be designed such that a user, for example the first software developer, may be able to choose if each of the data element candidate production methods may be used for determining the data element candidates 5. If all data element candidate production methods may be chosen, the data element candidates 5 may comprise all the respective possible data element candidates which may be gained by selecting each data element candidate production method.

The communication system 3 may be designed such that the user may adjust the data element candidate production methods, for example by changing the first threshold manually.

In a further example, an overall usage score for each data element 5 of the set 4 of data element candidates may be determined dependent on the first usage and the second usage of the respective data element 5. The first usage and/or the second usage may be in the form of the first aggregation of the different types of usages of the given data elements 1 and the second aggregation of the further different types of usages of the data element candidates 5 respectively, as described above. The different types of usages may comprise the labelling, the ranking, and/or the governing. The further different types of usages may comprise the respective application of the data element candidates 5 to the software development architecture 60, to the data representation elements 51, to the set 40 of machine learning modules 41, to the connection architecture, and/or to the search engine 70.

The communication system 3 may comprise a lineage module 98 (shown in FIG. 3) for the evaluation of the further different types of usages. The lineage module 98 may record a number of times each data element candidate 5 may be transferred from the data server 99 to the software development architecture 60, to the search engine 70, and/or to the set 40 of machine learning modules 41. The lineage module 98 may keep track of how the given data elements 1 or the data element candidates 5 are transferred within the communication system 3, preferably between the components of the communication system 3. The lineage module 98 may alleviate calculation of the above mentioned influence values of each data element 1 or data element candidate 5.

The overall usage score for each data element candidate 5 may be calculated by determining the weighted sum of the first influence value, the second influence value, and preferably at least the first further influence value, as mentioned above. For example, the overall usage score of each data element candidate 5 may be calculated as the weighted sum of the first, the second, and preferably the first, second, third, fourth, fifth, sixth, seventh, and/or eighth further influence value.

The first, second, and the first, second, third, fourth, fifth, sixth, seventh and/or eighth further influence value of each data element candidate 5 may be equal or may correlate to the number of times the respective data element candidate 5 is assigned to one of the terms of the nomenclature, the number of machine learning modules 41 to which the respective data element candidate 5 is applied, the number of times the respective data element candidate 5 is used for the linking, the number of times the respective data element candidate 5 is used within the software development architecture 60, the number of times the respective data element candidate 5 is used in the search performed by means of the search engine 70, the number of times the respective data element candidate 5 is linked to linked to one other data element of the given data elements 1, the ranking number of the respective data element candidate 5 in the ranking database 81, the number of times the respective data element candidate 5 is processed by the set of applications, the number of times the respective data element candidate 5 is included in the data representation elements 51, or the number of times the respective data element candidate 5 is assigned to one of the rules of the governance rules.

One example, wherein the second influence value of each data element candidate 5 may correlate to the number of machine learning modules 41 to which the respective data element candidate 5 is applied may be given by calculating the respective second influence value as a quotient of the number of machine learning modules 41 to which the respective data element candidate 5 is applied and a total number of the machine learning modules 41.

In a further variant, the communication system 3 may be designed such that the user may adjust a weight of the first, the second, and preferably the first, second, third, fourth, fifth, sixth, seventh, and/or eighth further influence value, wherein the respective influence value may be weighted according to its weight for calculating the weighted sum. This may enable the user to prioritize single type of usages of the data elements 1. Also, an ordering according to a single type of usage may be enabled by this variant. In a further example, the communication system 3 may be designed such that the user may initiate the data element candidate production methods to create the data element candidates 5.

The data element candidates 5 may be sorted using the respective overall usage score of each data element candidate. The sorted data element candidates may be displayed on the display 97, preferably with the above described metadata. The metadata may comprise relationships of each data element candidate 5 to other data elements of the given set or preferably of the data element candidates 5. The communication system 3 may be designed such that the user may approve or reject at least one of the sorted data element candidates 5. Preferably, each of the data element candidates 5 may be approved or rejected according to the overall usage score or the metadata of the respective data element candidate. This may also be performed automatically. In response to an approval of the respective data element of the data element candidates 5, this data element may be stored as an important data element for the communication system 3, preferably in a second database 96. These approved data elements may be accessible for the components of the communication system 3 in the form of important data elements within the communication system 3.

Furthermore, the communication system 3 may be designed such that metadata of an approved or rejected data element of the data element candidates 5 may be stored and may be compared with metadata of another data element of the data element candidates 5 or of further data element candidates generated in the future.

In one example, the first and/or second type of usage may be evaluated with respect to a time scale. For example, each of the above mentioned influence values may be calculated repeatedly for various different consecutive time slabs and may be weighted according to a respective time period between an actual point of time and an instant of time at which the respective influence value was calculated. Thus, a set of weighted influence values weighted with respect to the time may be created for each above mentioned influence value, such as the first, second, and the first, second, third, fourth, fifth, sixth, seventh, and/or eighth further influence value of each data element candidate 5. These sets of weighted influence values may be used to determine the overall usage score. For example, the sets of weighted influence values may be used to calculate the weighted sum instead of using the single first, second, and the first, second, third, fourth, fifth, sixth, seventh, and/or eighth further influence value of each data element candidate 5.

In another example, the time scale may be considered by weighting an application of each data element 1 to one of the terms of the nomenclature with respect to a point of time at which this term may be added to the nomenclature. The shorter a time frame between this point of time and the actual point of time, the higher the influence value of the respective data element 1 with respect to the application to the nomenclature. Similarly, a further point of time at which one of the machine learning modules 41 may be generated may influence the influence value of the respective data element 1 with respect to the application to the set 40 of the machine learning modules 41.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for sorting data elements of a given set of data elements, the method comprising:
    performing an evaluation of a first type of usage of each data element of the given set of data elements to determine a first influence value of the respective data element with respect to a first type of communication in a communication system;
    determining a set of data element candidates for the sorting based on the first influence values, the set of data element candidates being a proper subset of the given set of data elements;

performing an evaluation of a second type of usage of each data element of the set of data element candidates to determine how many times the respective data element is assigned to a governance rule that determines allowable types of processing of an assigned data element;

sorting the data elements of the set of data element candidates based on how many times the respective data element is assigned to a governance rule that determines allowable types of processing of an assigned data element;

providing the sorted data elements of the set of data element candidates; and utilizing the provided sorted data elements of the set of data element candidates to approve performance of data processing in accordance with the types of processing allowed by governance rules to which a chosen data element of the sorted data elements is assigned.

2. The method of claim 1, wherein:
the communication system comprises a set of machine learning modules; and
the first or the second type of usage of each data element of the given set of data elements and the set of data element candidates, respectively, comprises an application of the respective data element to at least one machine learning module of the set of the machine learning modules.

3. The method of claim 1, wherein:
the communication system comprises data representation elements; and
the first or second type of usage of each data element of the given set of data elements and the set of data element candidates, respectively, comprises an inclusion of information given by the respective data element in the data representation elements.

4. The method of claim 1, wherein:
the communication system comprises a software development architecture; and
the first or second type of usage of each data element of the given set of data elements and the set of data element candidates, respectively, comprises an application of the respective data element to the software development architecture.

5. The method of claim 1, wherein:
the communication system comprises a search engine; and
the first or second type of usage of each data element of the given set of data elements and the set of data element candidates, respectively, comprises an application of the respective data element to the search engine.

6. The method of claim 1, wherein:
the communication system comprises a connection architecture; and
the first or second type of usage of each data element of the given set of data elements and the set of data element candidates, respectively, comprises an application of the respective data element to the connection architecture.

7. The method of claim 1, wherein:
the communication system comprises a ranking system; and
the first or second type of usage of each data element of the given set of data elements and the set of data element candidates, respectively, comprises an application of the respective data element to the ranking system.

8. The method of claim 1, wherein:
the communication system comprises a set of applications; and
the first or second type of usage of each data element of the given set of data elements and the set of data element candidates, respectively, comprises an application of the respective data element to the set of applications.

9. The method of claim 1, wherein:
the communication system comprises a nomenclature, the nomenclature comprising terms for describing the data elements; and
the first or second usage of each data element of the given set of data elements and the set of data element candidates, respectively, comprises assigning the respective data element to a selected term of the terms of the nomenclature.

10. The method of claim 9, wherein:
the evaluation of the first and/or second usage of each data element of the given set of data elements and the set of data element candidates, respectively, is performed by comparing the selected term to which the respective data element is assigned with a further term; and
a further data element is assigned to the further term and marked as important with respect to the communication system.

11. The method of claim 9, wherein:
the evaluation of the first and/or second usage of each data element of the given set of data elements and the set of data element candidates, respectively, is performed by comparing the selected term to which the respective data element is assigned with a further term, the further term being given by a user of the communication system.

12. The method of claim 1, wherein:
the governance rules comprise a protection rule relating to a protection of data elements assigned thereto.

13. The method of claim 1, wherein:
the first influence value of the respective data element indicates an influence level of the respective data element with respect to the first type of communication in the communication system.

14. The method of claim 1, wherein:
the second influence value of the respective data element indicates an influence level of the respective data element with respect to the second type of communication in the communication system.

15. The method of claim 1, further comprising:
determining an overall usage score for each data element of the set of data element candidates dependent on multiple different types of usages of the respective data element, wherein:
the multiple different types of usages comprise at least the first and the second type of usage,
the overall usage score indicates an overall influence level of the respective data element with respect to the communication system, and
sorting the data elements is performed based on the overall usage score for each data element of the set of data element candidates.

16. The method of claim 15, further comprising:
displaying metadata of the data elements of the set of data element candidates for selecting a portion of the sorted data elements of the set of data element candidates for data processing,
wherein the metadata comprises information related to a generation of the overall usage score of the respective data element.

17. A computer program product comprising a computer readable storage medium having program instructions embodied therewith, the program instructions executable by a processor to cause the processor to perform a method comprising:
performing an evaluation of a first type of usage of each data element of the given set of data elements to determine a first influence value of the respective data element with respect to a first type of communication in a communication system;
determining a set of data element candidates for the sorting based on the first influence values, the set of data element candidates being a proper subset of the given set of data elements;
performing an evaluation of a second type of usage of each data element of the set of data element candidates to determine how many times the respective data element is assigned to a governance rule that determines allowable types of processing of an assigned element;
sorting the data elements of the set of data element candidates based on how many times the respective data element is assigned to a governance rule that determines allowable types of processing of an assigned data element;
providing the sorted data elements of the set of data element candidates; and
utilizing the provided sorted data elements of the set of data element candidates to approve performance of data processing in accordance with the types of processing allowed by governance rules to which a chosen data element of the sorted data elements is assigned.

18. The method of claim 1, further comprising:
applying a protection algorithm to the data element candidates assigned to the governance rule prior to utilizing the provided sorted data elements to perform data processing.

19. A computer system for sorting data elements of a given set of data elements, the computer system comprising a processor configured to:
perform an evaluation of a first type of usage of each data element of the given set of data elements to determine a first influence value of the respective data element with respect to a first type of communication in a communication system;
determine a set of data element candidates for the sorting based on the first influence values, the set of data element candidates being a proper subset of the given set of data elements;
perform an evaluation of a second type of usage of each data element of the set of data element candidates to determine how many times the respective data element is assigned to a governance rule that determines allowable types of processing of an assigned data element;
sort the data elements of the set of data element candidates based on how many times the respective data element is assigned to a governance rule that determines allowable types of processing of an assigned data element;
provide the sorted data elements of the set of data element candidates; and
utilize the provided sorted data elements of the set of data element candidates to allow performance of data processing in accordance with the types of processing allowed by governance rules to which a chosen data element of the sorted data elements is assigned.

20. The computer system of claim 19, wherein:
the processor is further configured to determine an overall usage score for each data element of the set of data element candidates dependent on multiple different types of usages of the respective data element,
the multiple different types of usages comprise at least the first and the second type of usage,
the overall usage score indicates an overall influence level of the respective data element with respect to the communication system, and
sorting the data elements is performed based on the overall usage score for each data element of the set of data element candidates.

* * * * *